Sept. 13, 1938.  C. BERG  2,129,728
TRAILER HITCH
Filed April 1, 1938
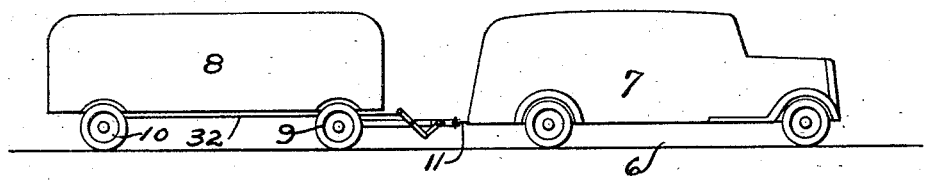
Fig.1.
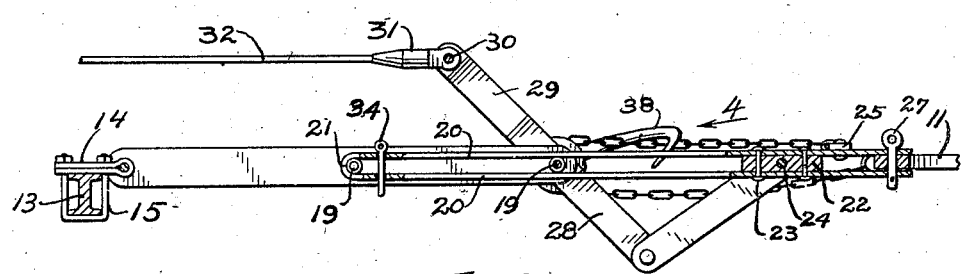
Fig.2.
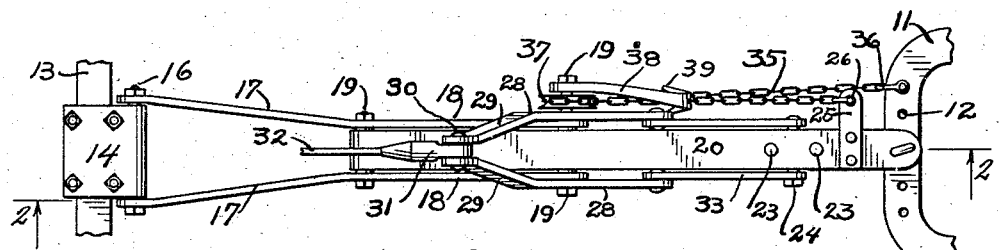
Fig.3.
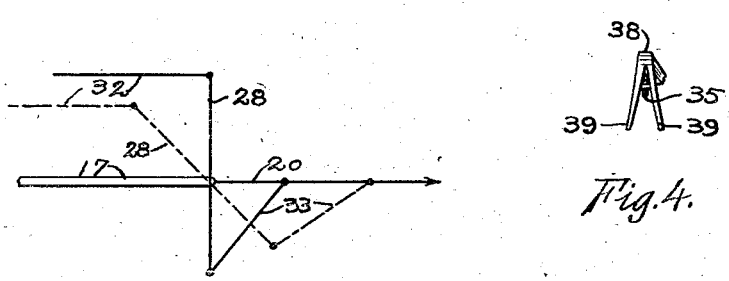
Fig.5.
Fig.4.
Inventor
Carl Berg.
By Martin E. Anderson
Attorney Patented Sept. 13, 1938

2,129,728

UNITED STATES PATENT OFFICE 2,129,728

TRAILER HITCH

Carl Berg, Arriba, Colo., assignor of one-half to Roy C. Liber, Denver, Colo.

Application April 1, 1938, Serial No. 199,418

6 Claims. (Cl. 188—142)

This invention relates to improvements in trailer hitches of the type employed for connecting a trailer to a tractor.

It is very common to employ an automobile or a truck as a tractor for pulling a trailer along the highways, and for this purpose it is necessary to provide a convenient means for hitching the trailer to the tractor.

In order to make it possible for the tractor to control the assembly in going down steep hills and in stopping, it is necessary to provide the trailers with brakes and where large units are employed, as for example, the big truck and tractor units employed for transporting freight, the trailer is frequently supplied with an air brake which is controlled by the driver of the tractor.

It is now quite common to employ an ordinary pleasure car for transporting a trailer, either of the kind employed for living quarters or for transporting small loads of freight. Such trailers are, as a rule, not employed with any brakes but depend entirely on the brake of the automobile, with the result that the assembly sometimes gets out of control in traveling down steep hills and in making sudden stops.

It is the object of this invention to produce a trailer hitch of a simple and substantial construction that can be used in connection with either two wheeled or four wheeled trailers and which will automatically apply a separate brake to the trailer whenever the tension in the hitch is converted into a compressive strain as in stopping or going down hill.

Another object of this invention is to produce a trailer hitch in which means is provided for automatically setting the brake in case the connection between the trailer and the tractor is broken for any reason.

The above and other objects that may become apparent as this description proceeds are attained by means of a construction and an arrangement of parts that will now be described in detail and for this purpose reference will be had to the accompanying drawing in which the invention has been illustrated in its present preferred form and in which:

Figure 1 is a view showing an assembly comprising a tractor and a trailer connected by means of the improved hitch which forms the subject of this invention;

Figure 2 is a section taken on line 2—2 Fig. 3, showing the construction of the trailer hitch;

Figure 3 is a top plan view of the trailer hitch;

Figure 4 is a detail elevation looking in the direction of arrow 4 in Fig. 2; and Figure 5 is a diagram showing the operation of the brake control means.

In the drawing reference numeral 6 designates the surface of the highway and 7 an automobile tractor which may be a heavy duty tractor or an ordinary pleasure car, and figure 8 represents a trailer.

In the drawing the trailer has been shown as having four wheels, a pair of front wheels 9 and a pair of rear wheels 10. The rear wheels are provided with conventional brakes which have not been shown in detail as they involve nothing new. The tractor is provided with a hitch bar 11 that is secured to it in any suitable manner and which is provided with a plurality of holes 12. Reference numeral 13 represents the front axle of the trailer and to this a hinge plate 14 is connected by means of two U-bolts 15. A bolt 16 extends through the hinge plate and through the ends of the tongue bars 17. These bars may be duplicates and are spaced farther apart at the rear end than at the front end. The sections indicated by reference numerals 18 are straight and are held in parallel relation by means of spacers 19. A tractor bar comprising two straight side members 20 is bent into an elongated U-shaped form such as that shown in Fig. 2. The two sides are connected by a curved base member 21 which represents the base of the elongated U. The sides 20 are held in spaced relation by a spacer block 22 that is secured to the bars by means of rivets 23. The spacer block 22 is provided with a transverse opening for the reception of the bolt 24. Attached to the upper bar is an anchor plate 25 that is provided at its outer end with hole 26. The two tractor bars 20 are provided near their front ends with openings for the reception of a coupling pin 27 by means of which the hitch is connected with the hitch member 11. Two levers 28 are pivoted to the front spacer 19 in the manner shown quite clearly in Figs. 2 and 3. The upper ends of the levers 28 are inwardly inclined as indicated by reference numerals 29 and are perforated for the reception of a pin 30 that serves to connect the coupling 31 with the upper ends of the levers. The tension member 32, which may be a rod or a steel cable, extends from the coupling member 31 to the brakes on the rear wheels. The lower end of each lever 28 is connected by means of a link 33 to the pivot pin 24. The parts are so adjusted that when the hitch member is under tension and the base 21 is in engagement with the rearmost spacer 19 the levers 28 will be upwardly and rearwardly inclined in the manner shown in Fig. 2. In case the trailer hitch is put under compression instead of under tension, as it is when going down hill or in stopping, the tractor bars move rearwardly because there is nothing to prevent them from moving in this direction except the block 22. This rearward movement of the tractor bars relative to the tongue tends to rotate the levers 28 in a clockwise direction, thereby putting the brake rod 32 under tension and applying the brake to the rear wheels. If the brake is applied too hard the compressive strains will be changed to tension strains and the brake will be slightly released so that the degree to which the brake is applied is automatically controlled. In Fig. 5 the normal position of levers 28 has been shown by dot and dash lines, while the brake applying position has been indicated by solid lines.

Whenever it is desired to back the assembly, it is necessary to prevent the tractor bars from moving rearwardly a sufficient distance to apply the brakes and for this purpose a pin 34 is inserted in openings directly in front of the rear spacer 19 and this pin limits the rearward movement of the tractor bars, thereby preventing the application of the brake during backing. Some States require that the trailer be attached to the tractor by means of a chain in addition to the regular tractor hitch and in the drawing a chain 35 has been shown with one end connected to the anchor plate 25 and the other end connected by means of a clevis 36 with the hitch member 11. This chain passes over a pulley 37 pivoted on the front spacer 19. It will be seen that if the tractor bars are disconnected from the hitch member 11 and tension is applied to the end of the chain connected with the hitch bar, this tension will move the tractor bars rearwardly, thereby applying the brake. If the pin 27, for example, should accidentally become misplaced, it is necessary to stop the trailer as quickly as possible and with the means here illustrated the brake will be applied under such circumstances. In order to prevent the brake from releasing when the chain breaks, a hook 38 is pivoted to the spacer 19 and is provided with two outwardly tapering fingers 39 that straddle the chain. When the brake is being applied the chain will slip rearwardly between the fingers 39 but will be held from movement in the opposite direction and therefore the brakes will not release when the chain breaks.

From the above description it will be apparent that the tractor hitch described and shown on the drawing is of a simple and substantial construction which can be manufactured and sold at a moderate cost and which will automatically apply the brakes to the tractor whenever this becomes necessary. The means for applying the brakes in case the hitch becomes disconnected from the tractor and for holding the brakes in applied position is a safety feature of great importance which can be incorporated with the tractor hitch without unduly complicating the construction or increasing the cost.

Having described the invention what is claimed as new is:

1. A trailer hitch for use with a tractor, and a trailer having supporting wheels provided with brakes, comprising in combination, a tongue formed from two bars having their rear ends connected with the trailer, means for holding the front ends of the bars in spaced parallel relation, a tractor member comprising two parallel bars, one positioned above and the other below the tongue spacers, the rear ends of the traction bars being connected, said connection in combination with the tongue spacer forming a stop, spacer means positioned between the traction bars, to the front of the tongue spacers, means for attaching the front ends of the tractor bars to a tractor, the tongue and the tractor member having a limited amount of lost motion, permitting relative longitudinal movement, and means for applying the brakes to the trailer when the tractor member is subjected to compressive strains.

2. A trailer hitch for use with a tractor, and a trailer having supporting wheels provided with brakes, comprising in combination, a tongue formed from two spaced bars having their rear ends connected with the trailer, spacer means for holding the front ends of the bars in spaced parallel relation, a tractor member comprising a flat bar bent into an elongated U-shape, one part being positioned above and the other below the tongue spacers, a spacer between the sides of the tractor member, adjacent its front end, a lever pivotally connected, near its center, with the tongue, a link having one end connected with the lower end of the lever and the other end pivotally connected with the tractor member whereby relative longitudinal movement between the tongue and the tractor member will produce a rocking movement of the lever, and a tension member connecting the upper end of the lever with the trailer brakes, whereby when the traction member is put under compression the brakes will be applied to the trailer wheels.

3. A trailer hitch for use with a tractor, and a trailer having supporting wheels provided with brakes, comprising in combination, a tongue formed from two bars having their rear ends connected with the trailer, means for holding the front ends of the bars in spaced parallel relation, a tractor member, comprising two parallel bars, one positioned above and the other below the tongue spacers, the rear ends of the traction bars being connected, said connection in combination with the tongue spacer forming a stop, spacer means positioned between the traction bars, to the front of the tongue spacers, means for attaching the front ends of the tractor bars to a tractor, the tongue and the tractor member having a limited amount of lost motion, permitting relative longitudinal movement, means for applying the brakes to the trailer when the tractor member is subjected to compressive strains, and means for applying the brakes to the trailer when the connection between the tractor and the tractor member breaks.

4. A trailer hitch for use with a tractor, and a trailer having supporting wheels provided with brakes, comprising in combination, a tongue formed from two bars having their rear ends connected with the trailer, means for holding the front ends of the bars in spaced parallel relation, a tractor member, comprising two parallel bars, one positioned above and the other below the tongue spacers, the rear ends of the traction bars being connected, said connection in combination with the tongue spacer forming a stop, spacer means positioned between the traction bars, to the front of the tongue spacers, means for attaching the front ends of the tractor bars to a tractor, the tongue and the tractor member having a limited amount of lost motion, permitting relative longitudinal movement, means for applying the brakes to the trailer when the tractor member is subjected to compressive strains, means for applying the brakes to the trailer when the connection between the tractor and the tractor member breaks, and means for latching the brakes in operative position when applied by the second mentioned brake applying means.

5. A trailer hitch for use with a tractor, and a trailer having supporting wheels provided with brakes, comprising in combination, a tongue formed from two bars having their rear ends connected with the trailer, means for holding the front ends of the bars in spaced parallel relation, a tractor member, comprising two parallel bars, one positioned above and the other below the tongue spacers, the rear ends of the traction bars being connected, said connection in combination with the tongue spacer forming a stop, spacer means positioned between the traction bars, to the front of the tongue spacers, means for attaching the front ends of the tractor bars to a tractor, the tongue and the tractor member having a limited amount of lost motion, permitting relative longitudinal movement, means for applying the brakes to the trailer when the tractor member is subjected to compressive strains, a pulley pivotally connected with the tongue, a flexible tension member passing around the pulley, one end of the tension member being connected with the tractor member at a point forward of the tongue, the other end of the tension member having means for effecting a connection with the tractor whereby the brakes will be applied to the trailer, whenever the tractor exerts a greater pull on the tension member than on the tractor member, and means for latching the brakes in one position when applied by the action of the tension member.

6. A trailer hitch for use with a tractor, and a trailer having supporting wheels provided with brakes, comprising in combination, a tongue formed from two spaced bars having their rear ends connected with the trailer, spacer means for holding the front ends of the bars in spaced parallel relation, a tractor member comprising a flat bar bent into an elongated U-shape, one part being positioned above and the other below the tongue spacers, a spacer between the sides of the tractor member, adjacent its front end, a lever on each side of the tongue, pivoted near its center to a pivot carried by the tongue, links pivoted at their lower ends to the lower ends of the levers and at their upper ends to the tractor member, at a point forward of the lever pivot whereby the upper ends of the levers will move forwardly when the tractor member moves rearwardly relative to the tongue, and a tension member connected with the upper ends of the levers and operatively connected with the brakes whereby the trailer brakes will be applied when the tractor member is subjected to compression.

CARL BERG.